Patented Sept. 15, 1942

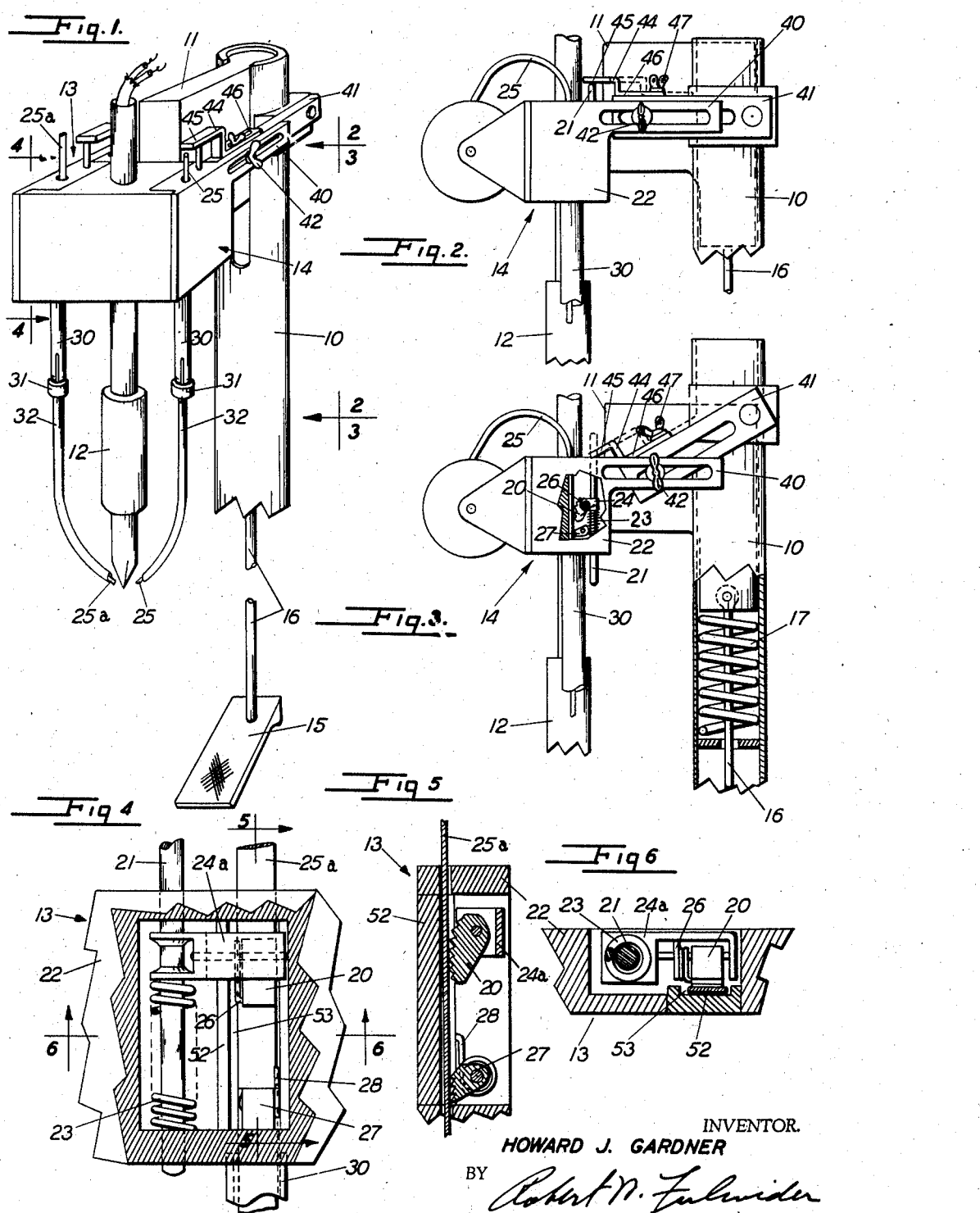

2,296,158

UNITED STATES PATENT OFFICE 2,296,158

SOLDERING APPARATUS

Howard J. Gardner, Hawthorne, Calif.

Application September 11, 1940, Serial No. 356,262

13 Claims. (Cl. 113—94)

My invention relates generally to feeders for soldering irons, and more particularly to automatic solder feeders for use with mechanically-operated soldering irons.

In manufacturing, it is often necessary to solder two members together which, because of their size, shape, or for other reasons, may preferably be held by hand instead of in a jig or other mechanical holding device. If only one hand need be used to hold the article to be soldered, a soldering iron provided with a solder feeder, such as that disclosed in my copending application Serial No. 310,150, filed December 20, 1939, now Patent No. 2,254,521, may be used, but if both hands must be used to hold the article, other means must be provided for holding the soldering iron and solder feeder. The soldering of terminal lugs on wires is an example of the type of work in which the operator may advantageously use both hands to hold the articles to be soldered, since by holding the lugs in one hand and the wire in the other, the two may be very rapidly placed together in their proper position. If a drop of solder is then placed in the proper location, the two will be securely held, but to apply the melted solder requires either the services of another person or a mechanically-operated means under the control of the workman.

It is therefore a major object of my invention to provide a mechanically-operated soldering apparatus which is under the control of the workman at all times, but which leaves both of his hands free to hold the work.

It is another object of my invention to provide such a soldering apparatus which supplies a predetermined amount of solder at each operation, but which may have this quantity varied within relatively wide limits.

It is a further object of my invention to provide such a device in which any one of several types of solder is immediately available, such as acid core wire solder, or plain ribbon-type solder.

These and other objects of my invention will become apparent from the following description of preferred and optional forms thereof, and from the drawing illustrating those forms, in which:

Fig. 1 is a perspective utility view of my improved apparatus with the supporting column broken away to show the foot treadle control;

Fig. 2 is a side elevational view taken at 2—2 in Fig. 1, and showing the feeder mechanism in its normal or rest position;

Fig. 3 is a side elevational view taken at 3—3 in Fig. 1, showing the feeder mechanism in operative position, with a portion of the housing broken away to show the action of the pivoted foot;

Fig. 4 is a side elevational view taken at 4—4 in Fig. 1, with a portion of the housing broken away to show an optional type of feeder mechanism that I prefer to use with flat or ribbon solder;

Fig. 5 is a cross-sectional view taken at 5—5 in Fig. 4, and showing the advancing foot and the retaining dog, and Fig. 6 is a cross-sectional view taken at 6—6 in Fig. 4 and showing the connection of the advancing foot to the operating plunger.

Referring now to the drawing, and particularly to Fig. 1 thereof, the numeral 10 indicates a columnar support of any suitable type which has a movable carrier block 11 at its upper end. Attached to the carrier block 11 is a soldering iron 12, and on either side of the soldering iron, I have shown solder feeders 13 and 14, though it will be apparent that additional solder feeders may be provided if desired. To move the carrier block 11 and its attached soldering iron 12 and feeders 13 and 14, I provide a foot treadle 15 to which is attached an operating rod or cable 16 preferably extending through the column 10 to the carrier block 11. A spring 17, shown in Fig. 3, urges the carrier block upwardly, so that when pressure on the foot treadle 15 is released, the carrier block 11, soldering iron 12, and feeders 13 and 14 return to their normal position. It will be apparent, of course, that other types of operative means may be provided, and in the claims the expression "mechanical means" is to be understood as including the foot treadle just described, as well as other manually and power operated means.

As shown in Figs. 2 and 3, solder 25 is supplied from a reel (not shown) to a housing 22 attached to the carrier block 11 which encloses the solder advancing mechanism. Within the housing 22 is a vertically-extending plunger 21 to which is firmly attached a clevis 24, and a spring 23 bears against the clevis and the lower end of the housing, urging the plunger upwardly. Pivotally attached to the clevis 24 is a foot 20 having a serrated sole surface adapted to bear against the solder 25 and urged thereagainst by a spring 26, the teeth of the foot being shaped so that they will be forced into the solder when the foot is advanced, but will ride over it, against the urging of the spring, when the foot is returned. Parallel to the axis of the plunger 21 and adjacent the sole of the foot 20, I provide a groove 53 in the side of the housing 22, of a size sufficient to hold the solder and guide it, while permitting the solder to be engaged and moved forward by the serrations on the sole of the advancing foot 20. To permit the use of different-sized solders, I have pivoted the foot 20 and curved the sole thereof in an arc such that the heel is much closer to the pivot point, measured radially, than the toe of the foot, and in this way, if a larger solder wire is used, the foot is merely rotated so that its sole is moved away from the side of the housing (in a counter-clockwise direction as shown in Fig. 3), while continuing to bear against the solder. The pivotal mounting and arcuate surface of the foot 20 make the alternate engagement and riding over of the foot possible without placing any strain on it, while at the same time insuring a positive pressure on the solder.

To prevent any possibility of the solder moving back with the foot 20 when the latter is returned, I provide a dog 27 which is pivotally attached to the housing 22 and provided with serrations similar to those on the foot 20 and likewise adapted to bear against the solder 25. The serrated surface of the dog 27 is arcuately formed, so that as the bearing surface of the dog is urged upwardly by the solder 25, the serrations are wedged into the solder; and since the latter has previously had ridges formed in it by the serrations of the foot 20, the dog 27 will firmly grip the solder and prevent its upward movement. A spring 28 urges the dog 27 against the solder at all times so that the dog will always be in position to prevent movement of the solder when the foot 20 is returned to its normal position.

From the housing 22, the solder 25 is guided downwardly to the tip of the soldering iron 12 by a tubular conduit 30 preferably formed of aluminum, and having a curved portion at its lower end to direct the solder against the tip of the iron. To provide for variations in the position of the soldering iron 12, I prefer to form the conduit of an upper, outer tube 30, split at its lower end and provided with a nut 31 which may compress the split end to hold securely a smaller tube 32 in the proper position. By keeping the conduit 30 spaced a slight distance from the side of the soldering iron 12, the conduit and the solder advancing mechanism are kept cooler, while a curve at the lower end of the tube 32 directs the solder against the tip of the iron where it is needed. A similar conduit arrangement may be used to guide the solder from the supply reel or the latter may be positioned above the advancing mechanisms 13 and 14 so that no conduit is necessary.

It will be apparent that the farther the plunger 21 is depressed, the farther the solder 25 will be advanced, and hence the greater the amount of the latter that will be delivered to the soldering iron 12. To provide simple means for depressing the plunger, adjustable so that different amounts of solder may be delivered for equal movements of the iron 12, I have provided the linkage arrangement shown in Figs. 2 and 3. As shown therein, the housing 22 is provided with a slotted ear 40 extending toward the column 10, and adjacent the ear is a slotted lever 41, pivotally attached to the column so that when the carrier block 11 is in its normal position, the slot in the lever 41 is aligned with the slot in the ear 40. Extending through the slots and holding the ear 40 and lever 41 together is a screw provided with a wing nut 42 which may be loosened to move the screw back and forth in the slots to any desired position. By making the slot of the ear 40 narrower than the slot in the pivoted lever 41, a bushing may be provided which will extend through the latter slot and bear against the ear 40, so that when the wing nut 42 is tightened, the screw will be firmly held by the ear 40 and will permit the pivoted lever 41 to turn about the bushing surrounding the base of the screw. The screw must be free to slide in the slot in the pivoted lever 41, since the ear 40 moves vertically, while the lever will have a horizontal component of motion since it is pivoted. On the upper side of the end of the pivoted lever 41 nearest the feeder mechanism 14, I provide a Z-shaped member 44 adapted to have its upper flange 45 bear against the upper end of the plunger 21, with the lower flange 46 supported by the pivoted lever 41. In addition, the lower flange 46 is longitudinally slotted to receive a screw having a wing nut 47 adapted to bear against the upper surface of the flange 46 and hold the Z-shaped member 44 in a predetermined position. As shown in Figs. 2 and 3, when the Z-shaped member 44 is moved toward the feeding mechanism 14, it will be in position to bear against the top of the plunger 21 so as to force the latter downward, but when the member 44 is moved away from the feeding mechanism, as shown in dotted outline in Figs. 2 and 3, the upper flange 45 will not touch the plunger, and hence the plunger will not be operated when the soldering iron 12 is depressed. By moving the screw and wing nut 42 to a point near the feeding mechanism 14, the plunger 21 will be depressed only a relatively slight amount for a given vertical movement of the soldering iron 12, since the pivoted lever 41 then has a relatively long lever arm. However, if the screw and wing nut 42 are moved near the column 10, the lever arm of the lever 41 will be relatively short, and the same given vertical displacement of the soldering iron 12 will cause a much greater movement of the end of that arm, and hence the plunger 21.

In this way, by adjusting the position of the screw and wing nut 42, the amount of solder delivered to the soldering iron 12 at each operation is under the control of the operator at all times, and in addition, by the movement of the Z-shaped member 44, the solder delivered by any one feeder may be used or not, as occasion may demand.

As an optional form of feeding means, I have developed the form shown in Fig. 4 which is particularly suitable for use with flat or ribbon type solder. Since this form of solder can be bent easily in only one plane, i. e., one perpendicular to its width, the solder must be advanced through its feeder mechanism so that the bending which takes place at the lower end of the tube 32 will be in this plane. In order that the advancing mechanism for both the wire and ribbon solder may be similarly shaped and disposed, I have developed the form of feeder shown in Figs. 4, 5, and 6. In this form, a plunger 21 extends through a housing 22 and is urged upwardly therein by a spring 23 as in my previously-described form. Attached to the plunger 21 is a clevis member 24a to which is pivotally attached an advancing foot 20, but the clevis member 24a is designed so that the line of contact of the advancing foot with the solder 25a is substantially parallel to a plane determined by the axes of the plunger 21 and the solder, instead of being substantially perpendicular to this plane, as in my previously-described form. The foot 20 is identical with that of my previously-described form, having an arcuate sole surface with serrations therein to engage the solder, and as in my previously-described form, I provide a spring 26 to urge the foot against the solder at all times. A dog 27 urged by a spring 28 bears against the solder to prevent its moving back when the foot 20 is returned to its normal position.

Instead of forming a groove in the housing itself, to receive the solder, I prefer to provide a channel member 52 which may be removed for repair or inspection of the advancing foot 20, and which is provided with a groove 53 adapted to receive the particular size and type of solder being used. Thus, if a narrow width ribbon solder is being used, a channel member having a relatively narrow groove therein is placed in the advancing mechanism, whereas if a wider ribbon solder is being used, a channel member having a wider groove is used; similarly a V-shaped groove may be used for round solder.

In both forms of solder advancing mechanism, cover plates are provided for the housing, so that dirt, dust, and other foreign matter are excluded from the mechanism, while permitting ready inspection and repair. While the two forms of advancing mechanism work equally well, the first form, that used for the round solder, is somewhat simpler in construction, but the second form, that used for the ribbon solder, may be used in certain applications where the first form is not suitable. It will be apparent, of course, that it is a simple matter to provide the first form with a removable channel member so that it too may feed either wire or ribbon solder, in order that it may likewise have as universal an application as the second described form.

While I have shown a block type of mounting for the advancing mechanisms 13 and 14 with the iron 12 mounted between them, it is to be understood that any suitable type of mounting wherein the advancing mechanism and the iron are rigidly held together may be employed.

In the operation of this soldering apparatus, the operator selects the type of solder for the work to be done, adjusts the Z member 44 feeding that particular type of solder so that the member will bear against the plunger 21, and moves the remaining Z members back so that they will not touch their respective plungers. By then adjusting the position of the screw and wing nut 42, the correct amount of solder will be delivered at each operation, and uniform results, so important in mass production, may thus be obtained. By then placing the work to be soldered beneath the iron 12 and depressing the foot treadle 15, the iron will be lowered to the work and simultaneously solder will be delivered to the iron in the correct amount. When the pedal 15 is released, the spring 17 will raise the iron to its original position, and the plunger 21 will return to its uppermost position, ready for another cycle of operation.

While I have shown and described a preferred and optional form of my invention, I do not wish to be limited to the particular form or arrangement of parts herein described and shown, since it will be apparent that modifications may be made which come within the scope of the appended claims.

I claim as my invention:

1. A soldering apparatus of the class described which includes: a support; a carrier reciprocably mounted on said support; mechanical means for moving said carrier; a soldering iron attached to said carrier and moved therewith; a supply of relatively flexible solder; means attached to said carrier for advancing said solder; means attached to said carrier for guiding said solder from said advancing means to the tip of said soldering iron; a slotted arm rigidly connected to said carrier and extending therefrom toward said support; a slotted lever pivotally attached to said support; a member extending through said slots and pivotally connecting said slotted arm and said slotted lever; and a member attached to said slotted lever and adapted to actuate said solder advancing means when said carrier is moved with respect to said support.

2. A device as described in claim 1 in which said solder advancing means includes a plunger to which is connected a pivoted foot having a serrated surface adapted to bear against said solder.

3. A soldering apparatus of the class described which includes: a support; a carrier reciprocably mounted on said support; mechanical means for moving said carrier; a soldering iron attached to said carrier and moved therewith; a supply of relatively flexible solder; a housing attached to said carrier and moved therewith; a reciprocable plunger within said housing, urged in one direction by a spring; a foot pivotally attached to said plunger and having a serrated arcuate surface adapted to bear against said solder and advance it; spring means urging said foot against said solder; a pivotally mounted dog having a serrated surface adapted to bear against said solder and restrain its motion in one direction; spring means urging said dog against said solder; means adapted to direct said solder from said housing to the tip of said soldering iron; and means attached to said support and adapted to reciprocate said plunger.

4. A device as described in claim 3 which is provided with a removable channel member adapted to support the entire length of solder within said housing.

5. A soldering apparatus of the class described which includes: a support; a carrier reciprocably mounted on said support; mechanical means for moving said carrier; a supply of relatively flexible solder; a soldering iron attached to said carrier and moved therewith; a housing attached to said carrier and moved therewith; a reciprocable plunger within said housing; spring means urging said plunger in one direction; grooved means adapted to guide said solder through said housing; a foot pivotally connected to said plunger and having a serrated arcuate surface adapted to bear against and advance said solder within said housing; spring means urging said foot against said solder; a pivotally mounted dog having a serrated surface adapted to bear against said solder and restrain its motion in one direction; spring means urging said dog against said solder; extensible tubular means adapted to direct said solder from said housing to the tip of said soldering iron; and adjustable means attached to said support and connected to said housing to reciprocate said plunger a predetermined amount.

6. A device as described in claim 5 in which said grooved guide means consists of a removable channel member.

7. A device as described in claim 5 in which said plunger reciprocating means includes a slotted ear rigidly attached to said housing and extending therefrom toward said support; a slotted lever pivotally attached to said support; a member extending through said slots and pivotally connecting said slotted ear and said slotted lever; and a member attached to said slotted lever adapted to reciprocate said plunger when said carrier is reciprocated.

8. A soldering apparatus of the class described which includes: a support; a carrier and mounted on said support and adapted to be reciprocably moved with respect to said support; a soldering iron attached to said carrier and moved therewith; solder advancing means attached to said carrier and moved therewith and adapted to deliver solder to the point of said iron, said advancing means being operated by a reciprocable plunger; and means attached to said support and adapted to operate said plunger when said carrier is reciprocated, said operating means including a pivotally mounted lever carrying a member which bears against said plunger.

9. A soldering apparatus of the class described, which includes: a support; a carrier reciprocably mounted on said support; a soldering iron attached to said carrier and moved therewith; a supply of relatively flexible solder; means attached to said carrier for advancing said solder; a slotted arm rigidly connected to said carrier and extending therefrom toward said support; a slotted lever pivotally attached to said support; a member extending through said slots and pivotally connecting said slotted arm and said slotted lever; and a member attached to said slotted lever and adapted to actuate said solder advancing means when said carrier is moved with respect to said support.

10. A soldering apparatus of the class described, which includes: a support; a carrier reciprocably mounted on said support; a soldering iron attached to said carrier and moved therewith; a supply of relatively flexible solder; means attached to said carrier for advancing said solder; a slotted arm rigidly connected to said carrier and extending therefrom toward said support; a slotted lever pivotally attached to said support; means pivotally connecting said slotted arm and said slotted lever; and a member attached to said slotted lever and adapted to actuate said solder advancing means when said carrier is moved with respect to said support.

11. A soldering apparatus of the class described, which includes: a support; a carrier reciprocably mounted on said support; a soldering iron attached to said carrier and moved therewith; a supply of relatively flexible solder; a housing attached to said carrier and moved therewith; a reciprocable plunger within said housing, urged in one direction by a spring; a foot pivotally attached to said plunger and having a serrated arcuate surface adapted to bear against said solder and advance it; spring means urging said foot against said solder; means to restrain return motion of said solder; means adapted to direct said solder from said housing to the tip of said soldering iron; and means attached to said support and adapted to reciprocate said plunger when said carrier is reciprocated.

12. A soldering apparatus of the class described, which includes: a support; a carrier reciprocably mounted on said support; a soldering iron attached to said carrier and moved therewith; a supply of relatively flexible solder; a housing attached to said carrier and moved therewith; a reciprocable plunger within said housing, urged in one direction by a spring; a foot pivotally attached to said plunger and having a serrated arcuate surface adapted to bear against said solder and advance it; spring means urging said foot against said solder; means adapted to direct said solder from said housing to the tip of said soldering iron; and means attached to said support and adapted to reciprocate said plunger when said carrier is reciprocated.

13. A soldering apparatus of the class described, which includes: a support; a carrier reciprocably mounted on said support; a soldering iron attached to said carrier and moved therewith; a supply of relatively flexible solder; a housing attached to said carrier and moved therewith; a reciprocable plunger within said housing; a foot pivotally attached to said plunger and having a serrated arcuate surface adapted to bear against said solder and advance it; spring means urging said foot against said solder; a pivotally mounted dog having a serrated surface adapted to bear against said solder and restrain its motion in one direction; spring means urging said dog against said solder; means adapted to direct said solder from said housing to the tip of said soldering iron; and means attached to said support and adapted to reciprocate said solder advancing foot when said carrier is reciprocated.

HOWARD J. GARDNER.